United States Patent [19]
Mims

[11] Patent Number: 5,765,453
[45] Date of Patent: Jun. 16, 1998

[54] PHOTOCELL TOOL

[76] Inventor: Parker B. Mims, Rte. 3, 104 Quail Run, Laurens, S.C. 29360

[21] Appl. No.: 493,908

[22] Filed: Jun. 23, 1995

[51] Int. Cl.$^6$ ................................................ H01K 3/32
[52] U.S. Cl. ................................... 81/53.11; 294/19.1
[58] Field of Search .................... 294/19.1, 24, 99.1; 81/53.1, 53.11, 53.12; 29/758, 270, 278, 705, 764

[56] References Cited

U.S. PATENT DOCUMENTS

| | | | |
|---|---|---|---|
| 1,541,839 | 6/1925 | Metzler et al. | 81/53.11 |
| 1,667,332 | 4/1928 | Stahler | 294/19.1 |
| 2,634,998 | 4/1953 | Flower | 81/53.11 |
| 2,637,587 | 5/1953 | Robinson | 81/53.11 |
| 2,720,410 | 10/1955 | Smith | 294/19 |
| 3,534,993 | 10/1970 | Le Vesque | 294/19.1 |
| 3,824,676 | 7/1974 | Ebert | 294/19.1 |
| 3,863,976 | 2/1975 | Loch | 294/97 |
| 4,525,006 | 6/1985 | Nowak et al. | 294/19.1 |
| 4,864,899 | 9/1989 | Morse | 294/19.1 |
| 4,965,930 | 10/1990 | Wnukowski | 29/758 |
| 5,016,504 | 5/1991 | Brunetto et al. | 81/488 |
| 5,065,537 | 11/1991 | Bailey | 40/618 |
| 5,379,666 | 1/1995 | Held | 294/19.1 |
| 5,553,373 | 9/1996 | Sprayberry | 81/53.11 |

Primary Examiner—Dean Kramer
Attorney, Agent, or Firm—Leatherwood Walker Todd & Mann, P.C.

[57] ABSTRACT

A photocell tool for allowing removal and replacement of a photocell from an overhead light fixture. The photocell tool includes an elongated portion having a generally circular photocell receiving aperture at one end thereof and at the other end thereof an attachment member for allowing an extension pole to be attached thereto. When attached to the extension pole, the photocell tool allows installation and removal of a photocell from an overhead light fixture from the ground.

9 Claims, 8 Drawing Sheets

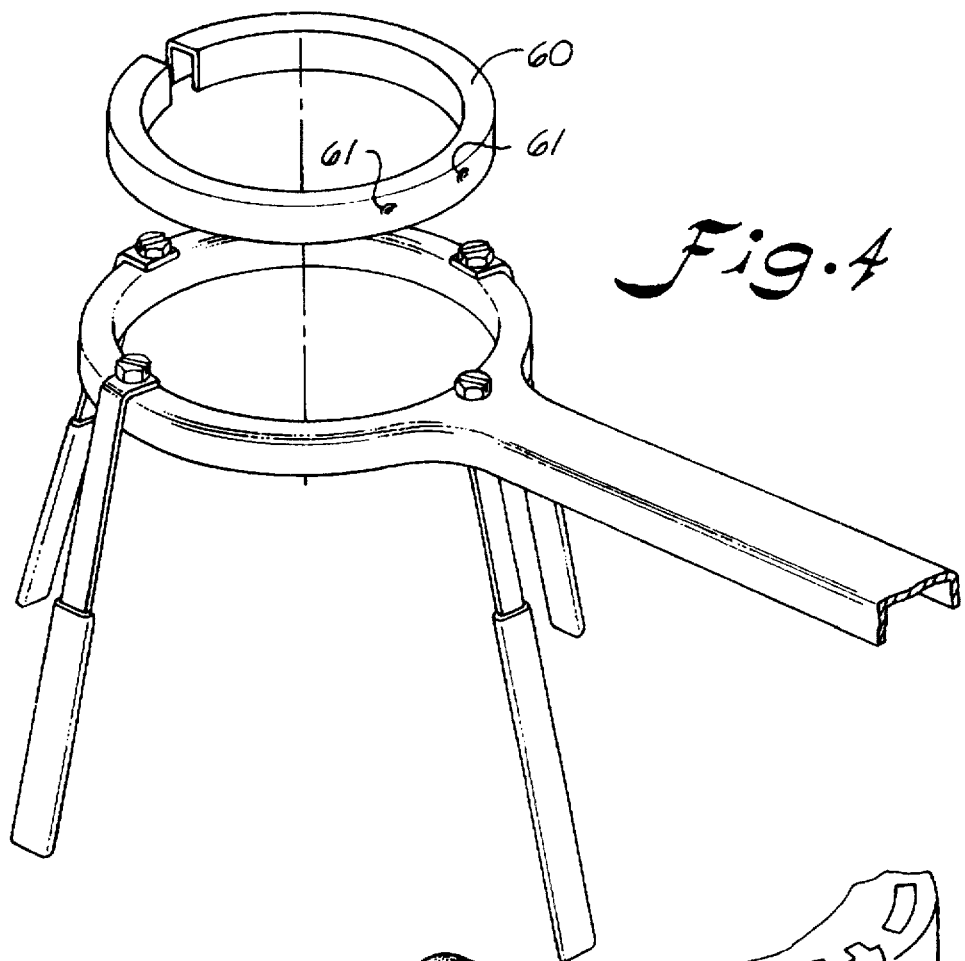
Fig. 4
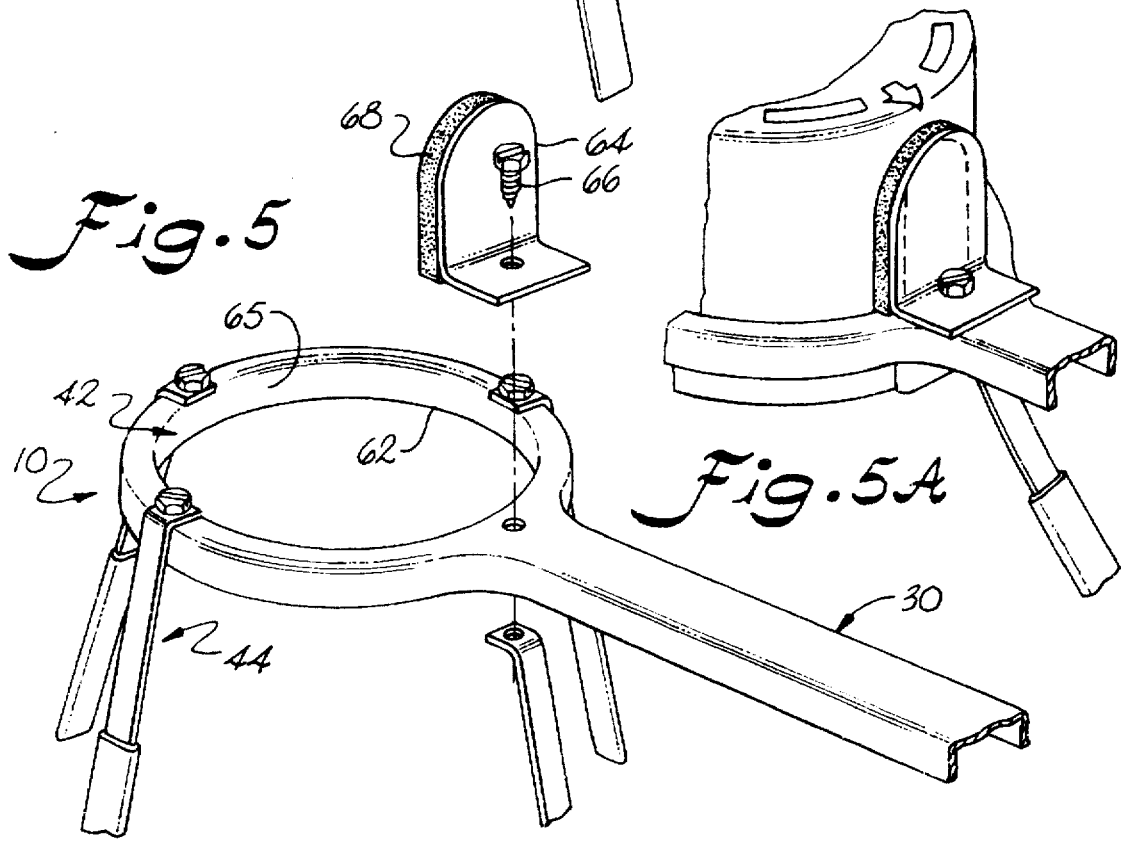
Fig. 5
Fig. 5A 5,765,453

1

PHOTOCELL TOOL

BACKGROUND OF THE INVENTION

This invention relates generally to a photocell tool for allowing installation and removal of a photocell from an overhead light fixture typically used in street lighting, security lighting, utility lighting, and the like.

Photocell switches are commonly found on outdoor lamps for automatically switching lamps on at dusk and switching them off at dawn. Lamps used for municipal, street, parking lot, etc. lighting are often positioned thirty (30) feet, or more, above the ground. Typical photocell switches have a transparent window through which light may pass for contacting a photo detector. Most photocells used in outdoor lighting are designed such that when the light received by the photo detector falls below a certain threshold, a switch is energized for causing the lamp to turn on. Conversely, upon light exceeding the threshold, the switch would be activated to turn the lamp off.

Photocells fail from time to time and require replacement. Typically, because of the elevation of the photocells atop the lighting fixture, a worker will climb to the top of the pole to the light fixture, which, because of the risk of falling, can be dangerous. Alternately, a truck having a container known as a "bucket" or "cherry picker" is required to lift a worker upwards to the photocell such that the worker can remove the photocell by hand from the lighting fixture. The bucket is generally a hydraulically-powered lift capable of carrying one or more workers, and because of its weight and operation, typically requires a truck of substantial size. Also, because of the safety aspect of having a worker in the bucket, another worker is often required to be on site, typically in the truck. Therefore, replacing a photocell often takes a worker making a potentially dangerous climb up to the light fixture or takes two workers and at least a moderately-sized truck having a bucket attachment.

It would be desirable for there to be a device which could allow a photocell to be removed from a light fixture by one worker standing on the ground. This would eliminate the need for a worker to climb up to the light fixture or for the additional worker and the truck-mounted bucket lift. Additionally, it would be desirable to have a device which would allow a photocell's operation to be determined by a worker standing on the ground. In other words, the window of the photocell switch could be selectively covered by the worker standing on the ground to determine whether the photocell would turn on the light, thereby mimicking a dark or nighttime situation.

Devices have been patented for manipulating overhead devices. For example, U.S. Pat. No. 3,824,676, issued to Ebert, discloses a device for placing a cover on an electrical insulator. The device includes an applicator tool connected to a pole by means of a ratchet fitting. U.S. Pat. No. 4,965,930, issued to Wnukowski, discloses an insulator installation tool having jaws connected to a pole by means of a clamp. U.S. Pat. No. 4,525,006, issued to Nowak, et al., discloses an electrical disconnect tool having an elongated tube to which a working head is attached. The working head includes opposed jaw members for insulatedly gripping and removing a high-voltage terminator from a holder. Finally, U.S. Pat. No. 5,065,537, issued to Bailey, discloses a changeable light system having a panel positioning tool.

While the foregoing designs are known, there still exists a need for tools usable by a worker on the ground for changing and testing an overhead photocell switch.

SUMMARY OF THE INVENTION

It is, therefore, the principal object of this invention to provide a tool for removing a photocell switch from an overhead light fixture.

2

It is another object of the present invention to provide a photocell tool for allowing installation of a photocell.

It is still another object of the present invention to provide a tool for allowing both removal and installation of a photocell switch of an overhead light fixture by a user standing on the ground.

It is still another object of the present invention to provide a photocell tool which can be used for installing and removing a variety of different styles of photocells from an overhead location.

Generally, the present invention includes a tool for removing and replacing a photocell switch having an elongated body portion, with the body portion defining a photocell aperture for selectively engaging, rotating, and retaining a photocell.

More specifically, the present invention includes a photocell tool for installing and removing from a light fixture a generally cylindrically shaped photocell switch, having a photocell window. The photocell tool is attachable to an extension pole or shaft and comprises an elongated body member, with the elongated body member defining a generally circular aperture for receiving the photocell. Engagement portions may be provided on the elongated body member for securely engaging, allowing rotation of, and retaining the photocell switch in the circular aperture, when desired. The elongated body member may further define a photocell window receipt portion for receiving the photocell window upon receipt of the photocell in the circular aperture. A pole attachment member may be connected to the elongated body member for attaching the pole to the elongated body member, and at least one positioning member may be connected to the elongated body member for contacting the light fixture to assist in positioning the circular aperture about the photocell.

The present invention further includes a method for using a photocell tool constructed in accordance with the present invention for removing, installing, and testing operation of a photocell switch.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 4 is a partial perspective view of an alternate embodiment of a photocell tool constructed in accordance with present invention having an insert provided therefor for allowing use of the tool on smaller diameter photocells;

FIG. 5 is a partial perspective view of an alternate embodiment of a photocell tool constructed in accordance with the present invention having a photocell window shield;

FIG. 5A is a partial view of the embodiment illustrated in FIG. 5 showing the photocell window shield positioned adjacent a photocell window;

DESCRIPTION OF THE PREFERRED EMBODIMENT

Figure 1:
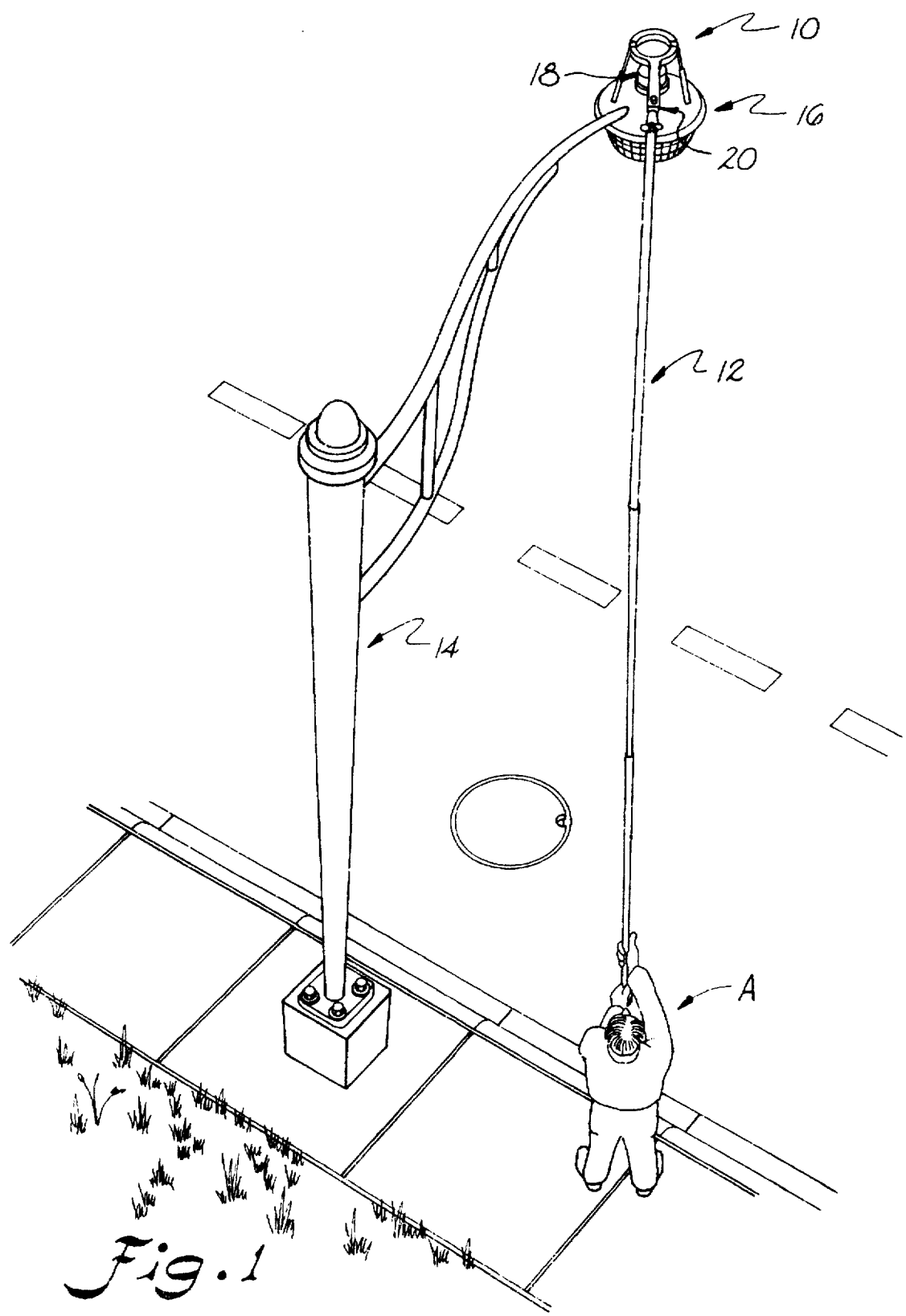
FIG. 1 is a perspective view of a photocell tool constructed in accordance with the present invention in actual use.

The accompanying drawings and the description which follows set forth this invention in its preferred embodiment. However, it is contemplated that persons generally familiar with tools will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the photocell tool of the present invention is indicated generally in the figures by reference character 10.

FIG. 1 discloses a worker A using the photocell tool 10 of the present invention. The photocell tool 10 is preferably attached to an elongated handle, telescoping pole 12, commonly known as a "hot stick". The pole 12 is constructed of plastic, fiberglass, or some other non-conductive material to minimize risk of shock or electrocution to the user. The light pole 14 is of a conventional design and includes a light fixture 16 at an end thereof. The photocell switch 18 (also referred to herein simply as a "photocell") is positioned atop the light fixture 16, and is of a generally cylindrical configuration. The photocell tool 10 is connectable to the extendable pole 12 by means of an adjustable member, or connector, generally 20, which allows the photocell tool 10 to be positioned at a desired angle or other rotational orientation with respect to the pole 12.

Figure 2:
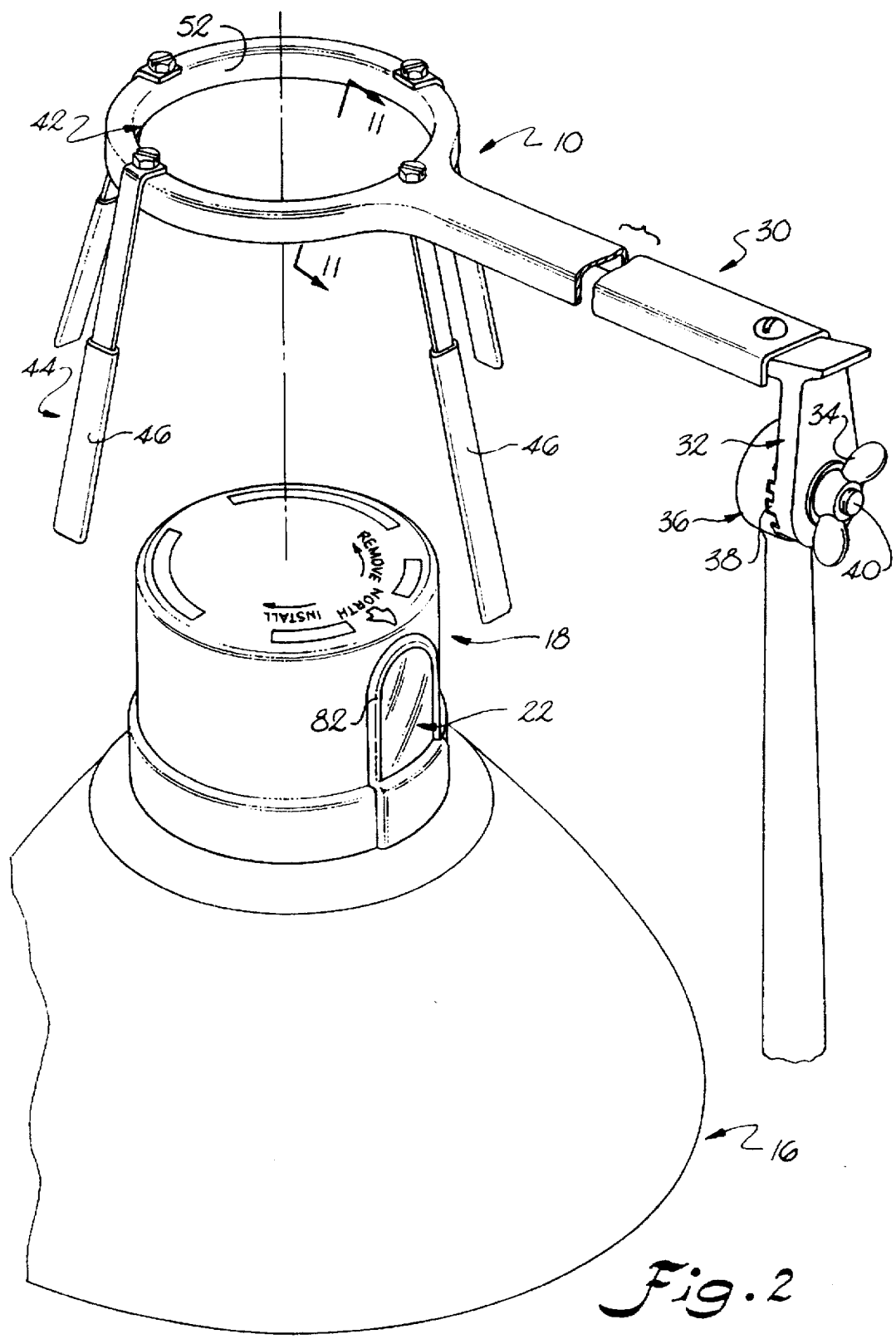
FIG. 2 is a partial perspective view of a photocell tool constructed in accordance with the present invention positioned above a photocell.

FIG. 2 illustrates the photocell tool 10 positioned above a photocell 18 of conventional design. The photocell 18 is designed for a particular orientation, generally such that a photocell window 22 located about the periphery of the photocell 18 faces North. The photocell 18 is generally inserted into an opening (not shown) provided in the top of the light fixture, or adjacent thereto, and is then rotated a predetermined amount to lock the photocell in place. Removal of the photocell from the light fixture is done in the reverse manner.

The photocell tool includes an elongated body member portion, or handle, generally 30 to which a cooperating pole attachment member, or connector, generally 32, is provided at one end thereof. In the embodiment illustrated in FIG. 2, a thumbscrew connector 34 is provided to facilitate angular adjustment of the connector 32 with respect to a connector 36 provided on the end of the pole 12. Each of the connector members 32, 36 include cooperating teeth 38 which allow for the connectors to be rotated with respect to one another, and then fixed by tightening of the thumbscrew nut 34 about a threaded shaft 40. It is to be understood that various other connectors could be used to connect tool 10 to pole 12 other than what is disclosed herein, and that the present invention is not limited to the connector shown.

At the other end of the handle 30 is a photocell receptacle, or socket, generally 42, for receipt and engaging the photocell 18 when the socket 42 is placed about the photocell. Downwardly extending positioning members, or fingers, generally 44, are also provided which serve to help the user locate and position the socket 42 above the photocell and for allowing engagement of the photocell in the socket 42. These fingers 44 are of particular importance in that the worker A, standing at ground level and using the pole 12, which is oftentimes 'flexible, will enjoy easier operation through use of the fingers 44 to help locate the socket 42 about the photocell 18. The fingers 44, which are shown as having resilient sleeves 46 constructed of materials such as plastic, rubber, vinyl, or the like, for engaging the top surface of the light fixture during positioning of the socket 42 over and about the photocell.

Figure 3:
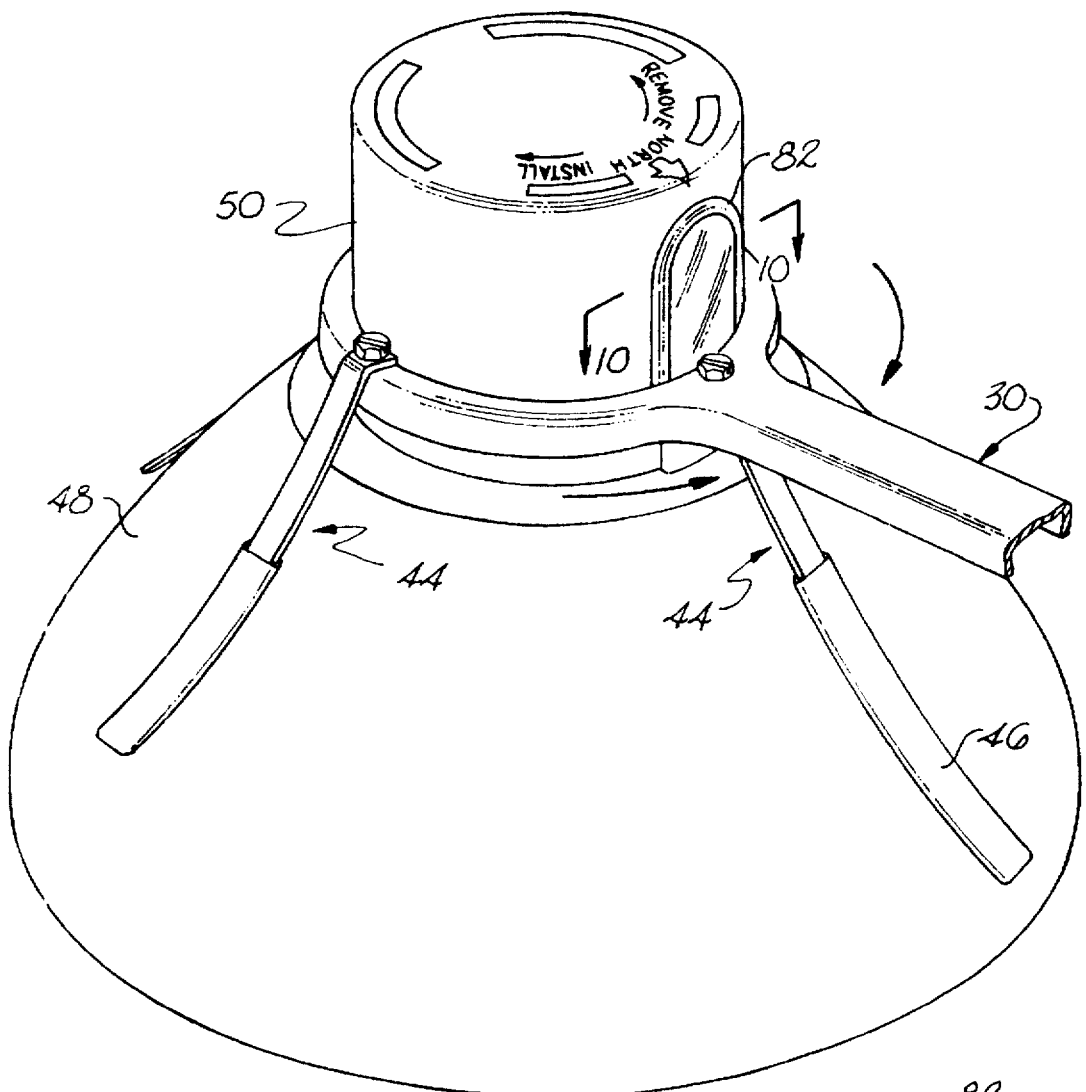
FIG. 3 is a partial perspective view of a photocell tool constructed in accordance with the present invention wherein a photocell is received within the photocell aperture of the tool.

FIG. 3 illustrates the socket 42 engaged about the photocell. The fingers 44 are engaged about the upper surface 48 of the light fixture and are shown in a somewhat flexed position. Once the photocell is engaged by the socket 42, the user rotates the handle, using the pole, such that the photocell becomes disengaged with the opening (not shown) in the light fixture. There is preferably an interference fit between the socket 42 and the peripheral surface 50 of the photocell, since the photocell, while generally cylindrically in shape, actually may typically include a slight taper in its periphery, such that as the socket 42 is brought downwardly to the lowermost position about the photocell, frictional engagement between the interior portion 52 of socket 42 and the exterior of the photocell is maximized.

Figure 3A:
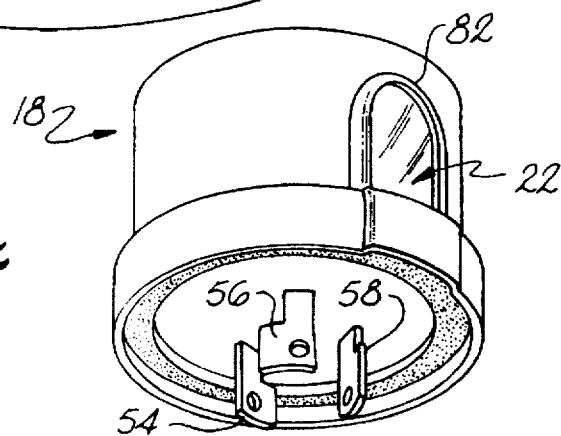
FIG. 3A is a perspective view of a conventional photocell.

FIG. 3A illustrates the photocell 18 from a bottom view, and also shows the conventional plugs 54, 56, 58 having a generally L-shape which will allow the photocell to be inserted and/or removed from the opening in the light fixture by a generally vertical movement, once the photocell has been rotated to the proper position with respect to the photocell opening of the light fixture.

FIG. 4 illustrates an alternate embodiment of the present invention. A sleeve, or collar 60, may be inserted within the socket 42 to allow photocells of smaller diameter to be engaged, removed, or installed by the photocell tool of the present invention. Recesses 61 may be provided on in collar 60 for receipt of projections 84, discussed below. The collar 60 would typically be constructed of a resilient material, such as plastic, rubber, vinyl, or the like, although any other suitable material could also be used.

FIG. 5 illustrates a further embodiment of the present invention, wherein an upstanding portion, such as a detachable shield 64 is provided on the photocell tool adjacent the socket. The shield is illustrated as being generally L-shaped and is detachable from the photocell tool. The interior wall surfaces 65 of the socket could also be provided with an engagement portion such as a ridge 62, or plurality of ridges or other projections or protuberances (not shown) which would further enhance secure engagement of the socket with the exterior of the photocell, if desired. A screw 66 is illustrated in FIG. 5A as means for attaching and detaching the shield 64, although any other suitable fixation connector could also be used. Preferably the shield 64 would include a resilient foam pad 68 or pad constructed of some other suitable material, such as plastic or rubber, which would engage and cover the photocell window 22 to allow the photocell to be tested by a worker standing on the ground. The worker would simply place the socket 42 about the photocell tool such that the shield 64 would cover the photocell window 22, thereby blocking or minimizing light passing through the photocell window. This would allow the worker to mimic a nighttime or dark condition during daylight for checking operation of the photocell. If, upon blocking the photocell window 22 with the shield 64, the light comes on, this would be an indication that the photocell may be operating properly.

Figure 6:
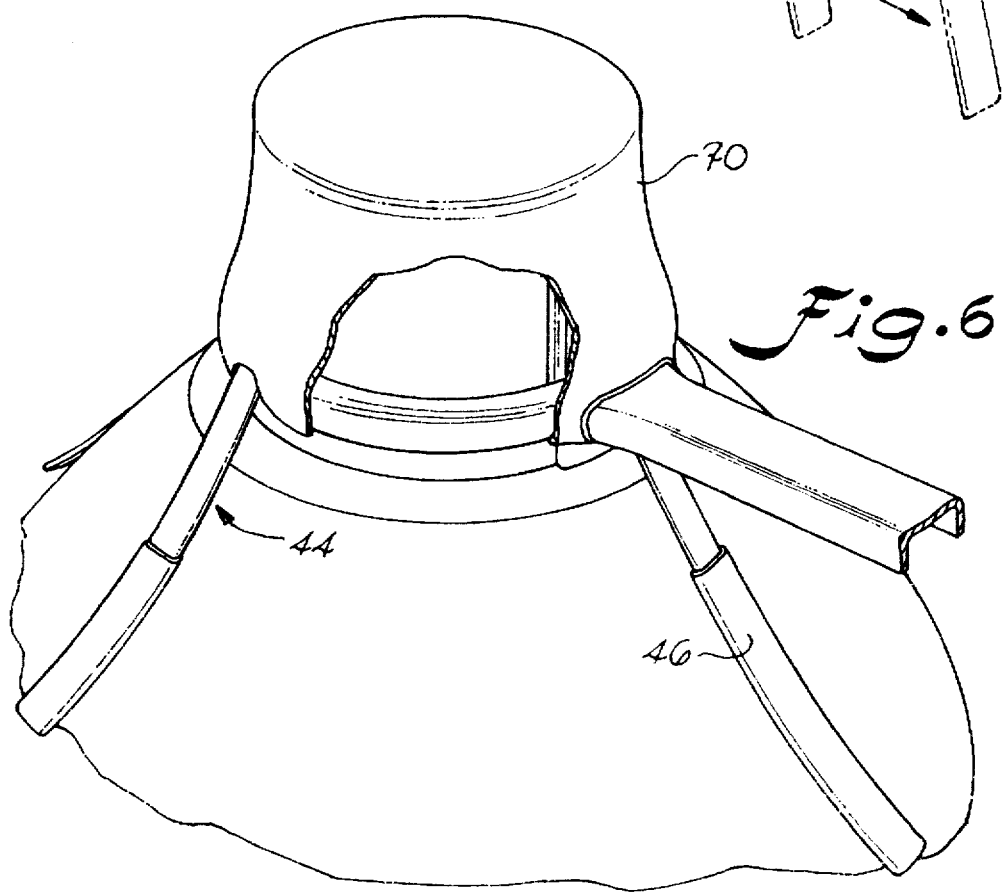
FIG. 6 is a perspective view of an alternate embodiment photocell tool constructed in accordance with the present invention having a cover covering the photocell window of a photocell.

FIG. 6 illustrates a further embodiment of the present invention which, instead, or in addition to the shield 64 illustrated in FIGS. 5 and 5A, a cover 70 is used in connection with the photocell tool. The cup-like cover structure 70 could be of a resilient material such as cloth, rubber, or vinyl, and substantially covers the socket. The cover 70 covers the photocell window 22 upon placement of the socket about the photocell to allow a nighttime situation to be simulated during daylight hours.

Figure 7:
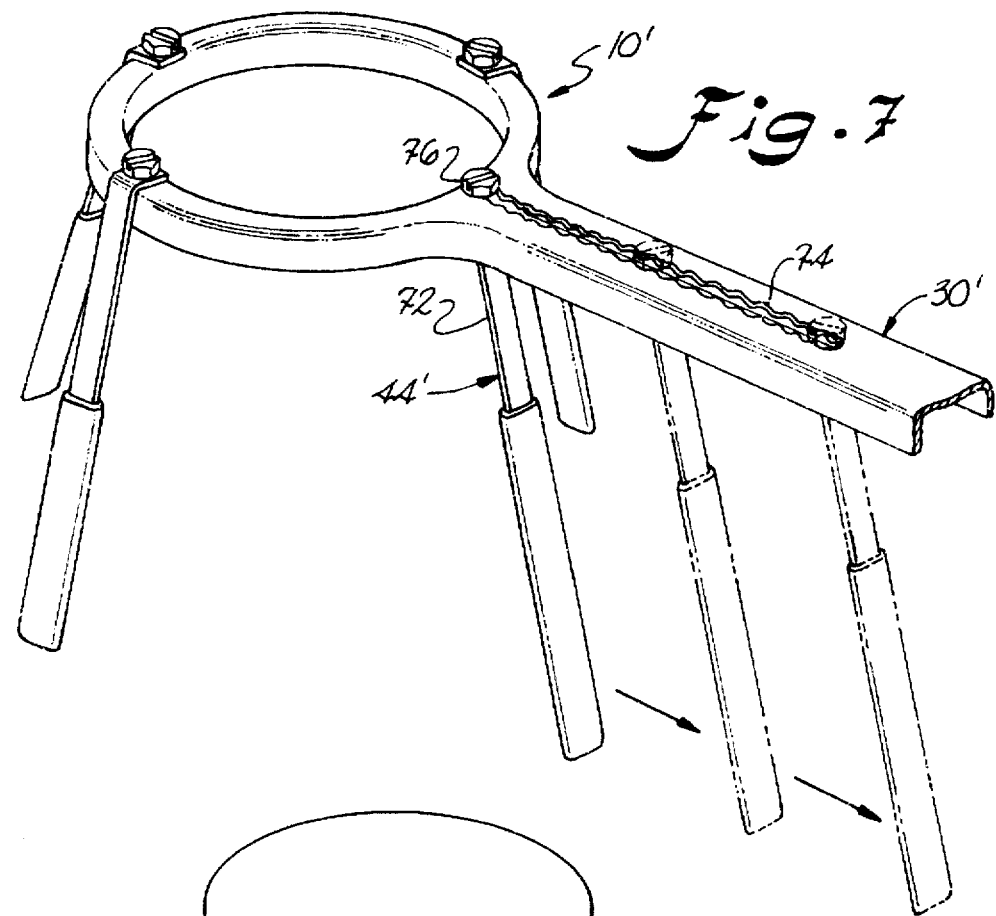
FIG. 7 is an alternate embodiment of a photocell tool constructed in accordance with the present invention having an adjustable positioning member.

FIG. 7 illustrates an embodiment of the present invention which has at least one adjustable finger 44'. The finger 44' may be adjusted through movement of the upper portion thereof 72 within an elongated slot 74 provided in the handle 30' of the photocell tool 10'. A screw 76 or other releasable fastener, such as a clip, detente, spring-loaded connector, etc. could also be used to selectively move and lock the adjustable finger 44' into place instead of the screw illustrated in FIG. 7. This embodiment would be particularly suited for light fixtures having an irregular shape. The adjustable finger 44' would facilitate positioning of the socket above the photocell of such light fixture.

Figures 8, 9:
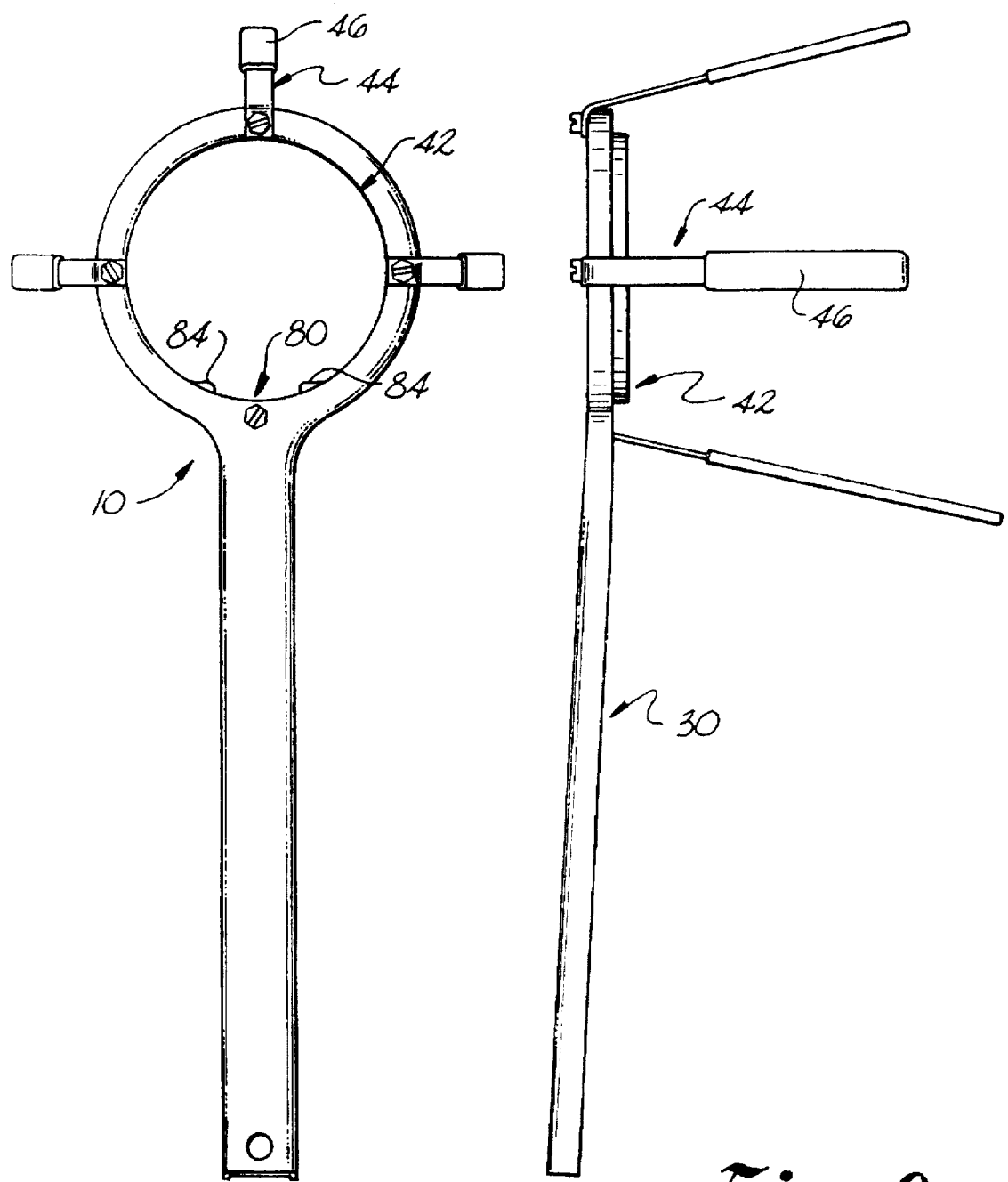
FIG. 8 is a plan view of a photocell tool constructed in accordance with the present invention.
FIG. 9 is a side elevational view of a photocell tool constructed in accordance with the present invention.

FIGS. 8 and 9 show additional views of the photocell tool illustrated in FIGS. 1 through 3. As is noted in FIG. 8, the photocell window receipt recess, or slot, generally 80, is preferably provided in a portion of the interior of the socket 42. Projections 84, bordering the slot would preferably engage with the raised window frame 82 provided around a typical photocell window 22. The engagement of the slot 80 with the window frame 82 enhances engagement of the socket with the exterior of the photocell during removal or installation of the photocell.

Figure 10:
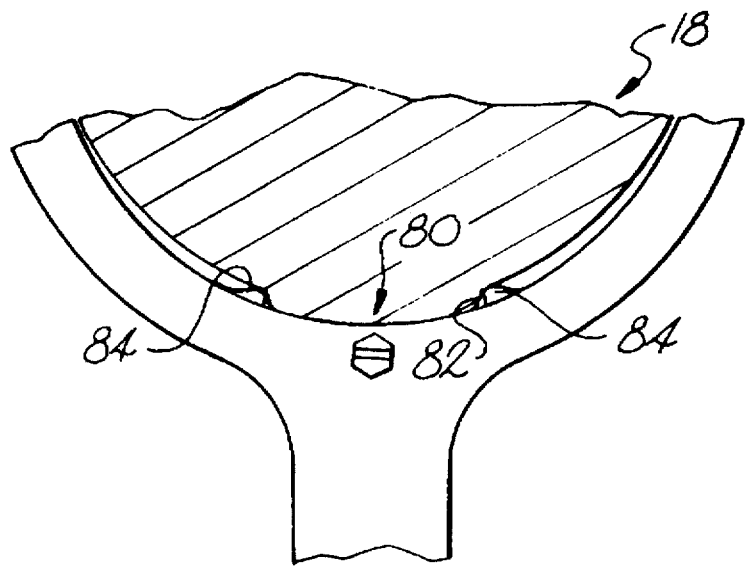
FIG. 10 is a sectional view taken along lines 10—10 of FIG. 3.
Figure 11:
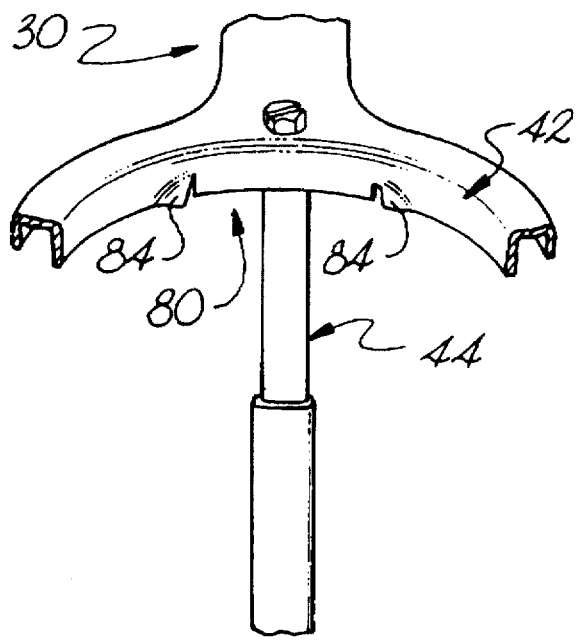
FIG. 11 is a sectional view taken along lines 11—11 of FIG. 2.

FIG. 10 illustrates engagement of the slot 80 with the photocell window frame 82 in a sectional view. Likewise, FIG. 11 also illustrates the projections 84 adjacent the slot 80.

Figure 12:
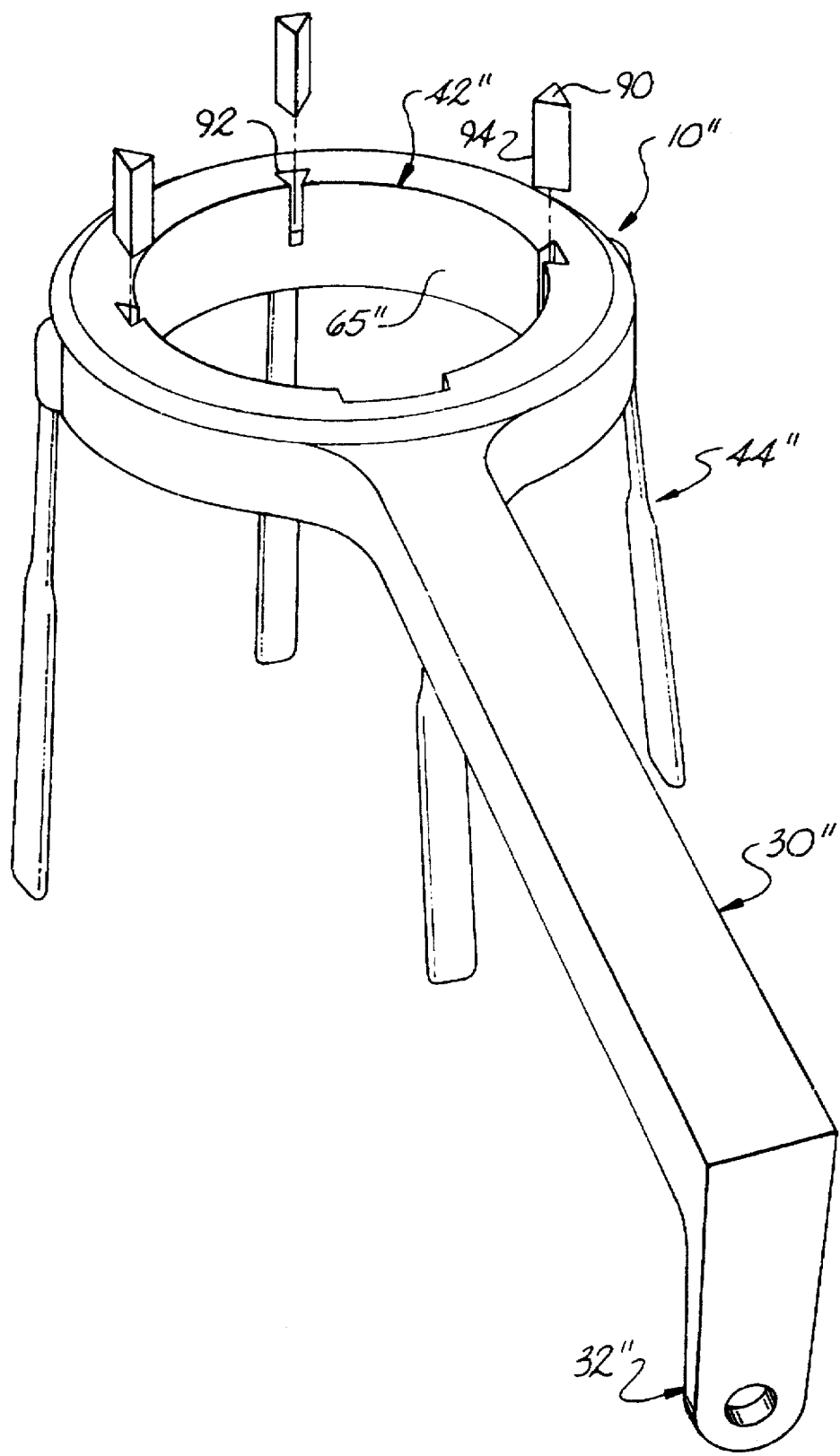
FIG. 12 is an alternate embodiment of a photocell tool constructed in accordance with the present invention having removable insert members.

FIG. 12 illustrates a further embodiment of the present invention which is a photocell tool 10" which can be of a unitary construction and molded out of material such as plastic, glass-filled nylon, fiberglass, or the like. The fingers 44" can be unitary with the handle 30", socket portion 42", and connector 32" of the same material.

Engagement members, such as wedge-shaped inserts 90 can also be provided in cooperating wedge-shaped engagement member openings 92 defined in the inner circumference of the socket. Upon insertion of the wedge-shaped members in the opening 92, the ridges 94 of the wedge-shaped members project outwardly from the wall 65", thereby effectively reducing the inner circumference of the socket. This effectively performs a similar function as does the collar illustrated in FIG. 4 and allows engagement of smaller diameter photocells by the photocell tool. These members 90 are readily insertable or removable such that the same tool can be used on a wide variety of photocells. Although members 90 are shown as being wedge-shaped, it is to be understood they could be of cylindrical, oval, triangular cross-section, or of a variety of other configurations.

From the foregoing, it can be seen that the present invention offers many advantages over the present method for changing and installing photocells from the top of overhead light fixtures. The present photocell tool can be used by one worker without the need of a bucket lift and supporting truck. Also, additional personnel are not required to assist the worker, as would typically be the case when a truck-mounted lift is used. Further, in addition to the present invention allowing a single worker on the ground to remove and replace a photocell, it also allows the worker to check the photocell's operation in daylight conditions.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A tool for removing and replacing a photocell in a fixture, the tool comprising:

a body member;

at least one engagement portion provided on said body member for gripping the photocell upon receipt of the photocell by said body member, such that the photocell may be moved by moving said body member for removing and installing the photocell in the fixture;

a photocell receptacle having a wall portion for surrounding the photocell upon receipt of the photocell by said body member; and said at least one engagement portion including a ridge provided on said wall portion.

2. A photocell tool for installing and removing a generally cylindrically-shaped photocell having a photocell window from a fixture, the photocell tool being attachable to a pole and comprising:

an elongated body member;

said elongated body member defining a photocell receptacle for receiving the photocell;

at least one engagement portion provided on said elongated body member for gripping the photocell upon receipt of the photocell by said photocell receptacle, such that the photocell may be moved by moving said elongated body member for removing and installing the photocell in the fixture;

said elongated body member defining a photocell window recess for receiving the photocell window upon receipt of the photocell in said photocell receptacle;

an attachment member connected to said elongated body member for attaching said elongated body member to the pole; and at least one positioning member connected to said elongated body member for contacting the fixture to assist in positioning the photocell receptacle about the photocell.

3. A photocell tool as defined in claim 2, wherein said photocell receptacle includes a wall portion for surrounding the photocell upon receipt of the photocell by said photocell receptacle.

4. A photocell tool as defined in claim 3, wherein said at least one engagement portion includes a ridge provided on said wall portion.

5. A photocell tool as defined in claim 2, wherein said at least one engagement portion includes:

said photocell receptacle defining a plurality of engagement member slots; and a plurality of removable engagement members, each being receivable in a respective one of said plurality of engagement member slots for engaging the photocell upon receipt of the photocell by said photocell receptacle.

6. A photocell tool as defined in claim 2, wherein said at least one positioning member includes a plurality of positioning members.

7. A photocell tool as defined in claim 2, wherein said at least one positioning member includes a plurality of positioning members, with at least one of said plurality of positioning members being moveable within said elongated body member and fixable at selective positions relative to said elongated body member.

8. A photocell tool as defined in claim 2, further comprising an upstanding portion connected to said elongated body member for selectively covering the photocell window of the photocell.

9. A photocell tool as defined in claim 2, further comprising a photocell cover connected to said elongated body member for selectively covering the photocell window of the photocell.

* * * * *